(12) United States Patent
Shirai et al.

(10) Patent No.: US 6,939,043 B2
(45) Date of Patent: Sep. 6, 2005

(54) ROLLING GUIDE APPARATUS AND ROLLER CONNECTING BODY

(75) Inventors: Takeki Shirai, Tokyo (JP); Hiroaki Mochizuki, Yamanashi (JP)

(73) Assignee: THK Co., Ltd., Tokyo (JP)

( * ) Notice: Subject to any disclaimer, the term of this patent is extended or adjusted under 35 U.S.C. 154(b) by 6 days.

(21) Appl. No.: 10/118,024

(22) Filed: Apr. 9, 2002

(65) Prior Publication Data

US 2002/0172436 A1 Nov. 21, 2002

(30) Foreign Application Priority Data

Apr. 11, 2001 (JP) .................................... P.2001-113120

(51) Int. Cl.[7] ............................................. F16C 29/06
(52) U.S. Cl. ...................................................... 384/44
(58) Field of Search ............................ 384/44, 45, 43; 464/168

(56) References Cited

U.S. PATENT DOCUMENTS 3,642,330 A * 2/1972 Newman ...................... 384/44
4,396,235 A * 8/1983 Teramachi ..................... 384/44
6,312,158 B1 * 11/2001 Teramachi et al. ............. 384/36
6,626,572 B2 * 9/2003 Teramachi ..................... 384/44

FOREIGN PATENT DOCUMENTS

CN 2373618 Y 4/2000

* cited by examiner

Primary Examiner—Lenard A. Footland
(74) Attorney, Agent, or Firm—Westerman, Hattori, Daniels & Adrian LLP

(57) ABSTRACT

A rolling guide apparatus includes a track rail having roller raceway surfaces and a roller circulation path including load roller raceway surfaces corresponding to the roller raceway surfaces, and plural rollers arranged and housed in the roller circulation paths and circulate in association with movement of a moving block relative to the track rail. Each roller has a ratio of approx. $1.5 < L/Da < $ approx. 3. By setting the ratio of roller length to roller diameter to a value of approx. $1.5 < L/Da$, the basic static load rating of a rolling guide apparatus of roller type becomes greater than that of a rolling guide apparatus of ball type when the pieces of the apparatus are of same model. By setting the ratio to a value of $L/Da < $ approx. 3, occurrence of skew is prevented without failure without involvement of rigorous dimensional control of the axial clearance.

8 Claims, 10 Drawing Sheets

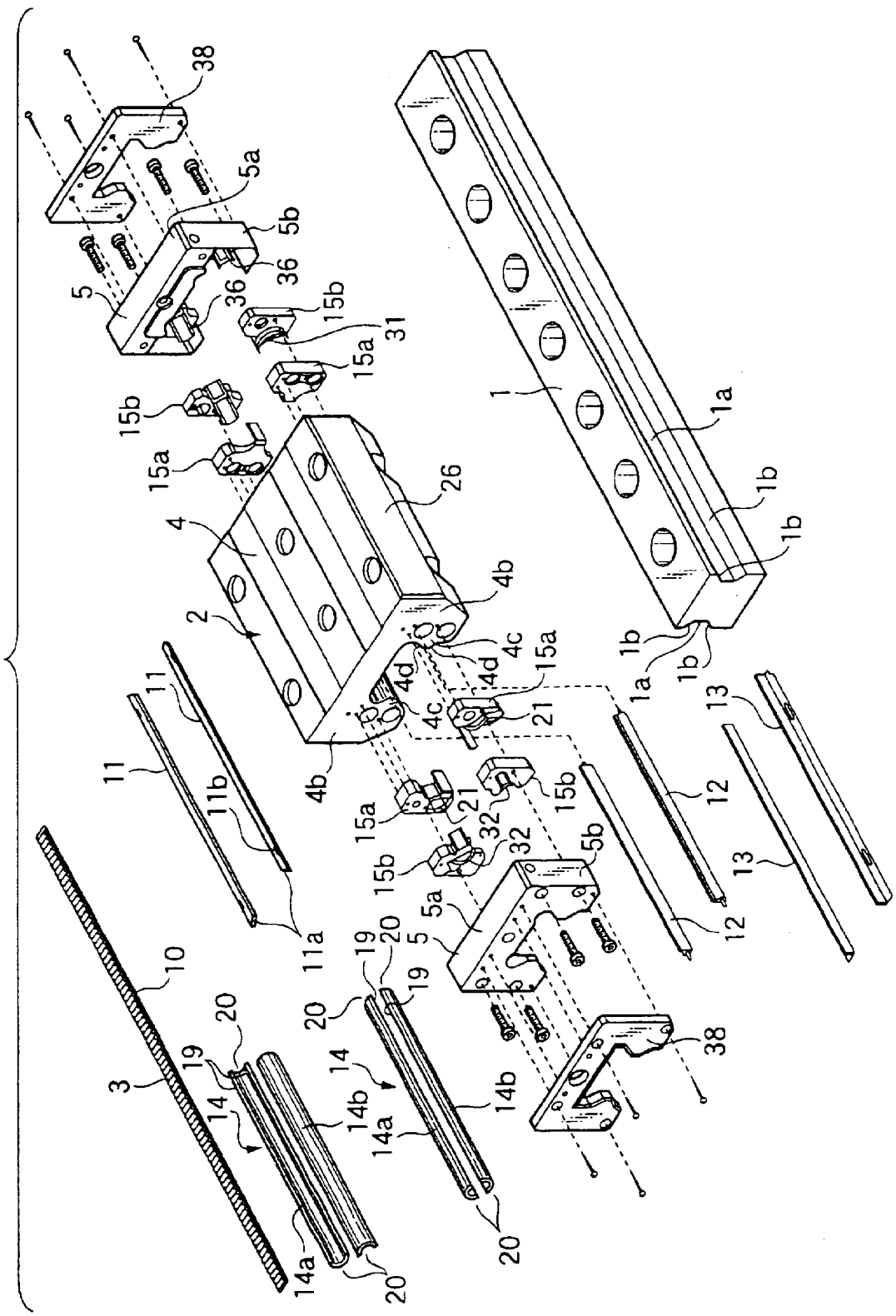

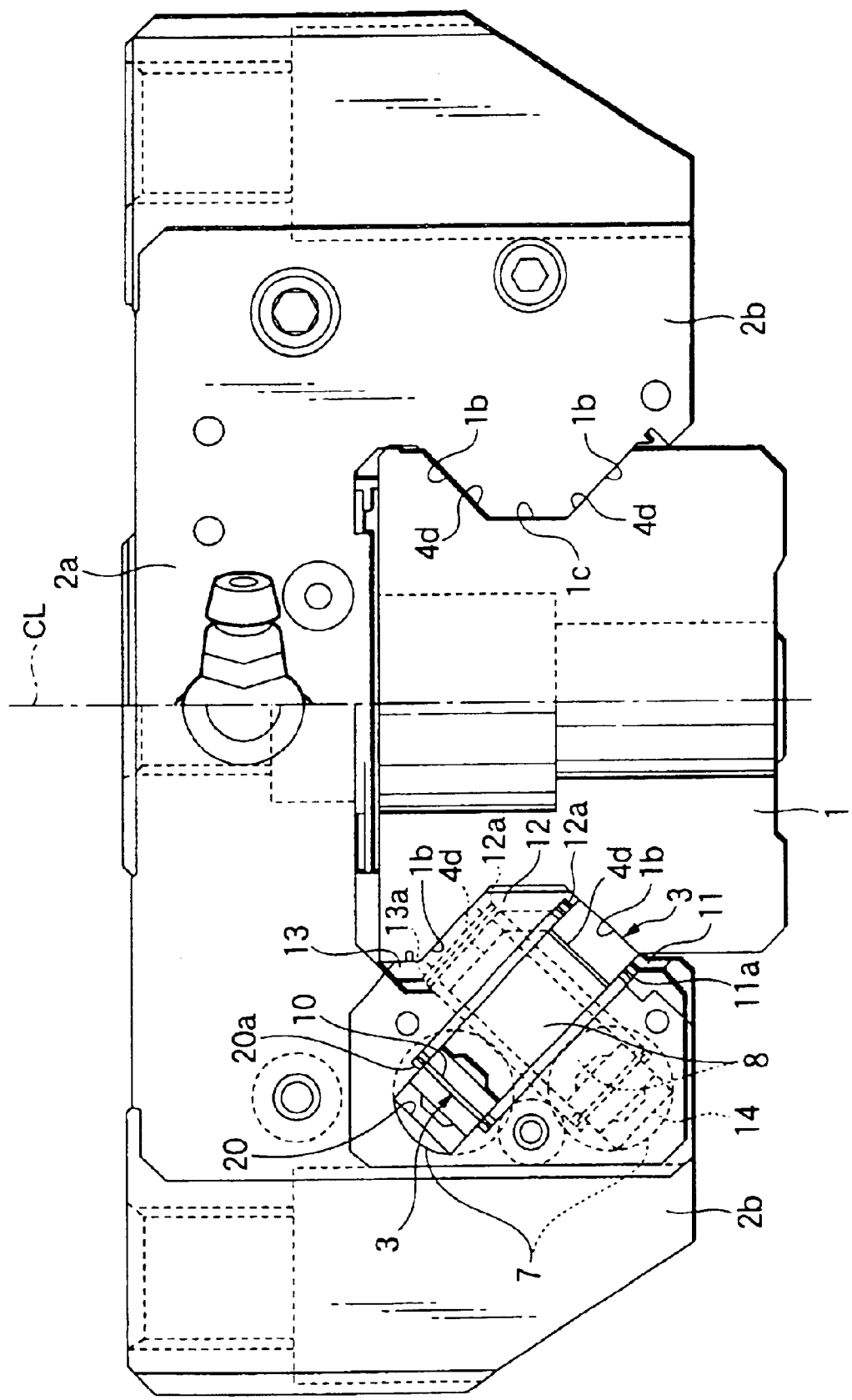

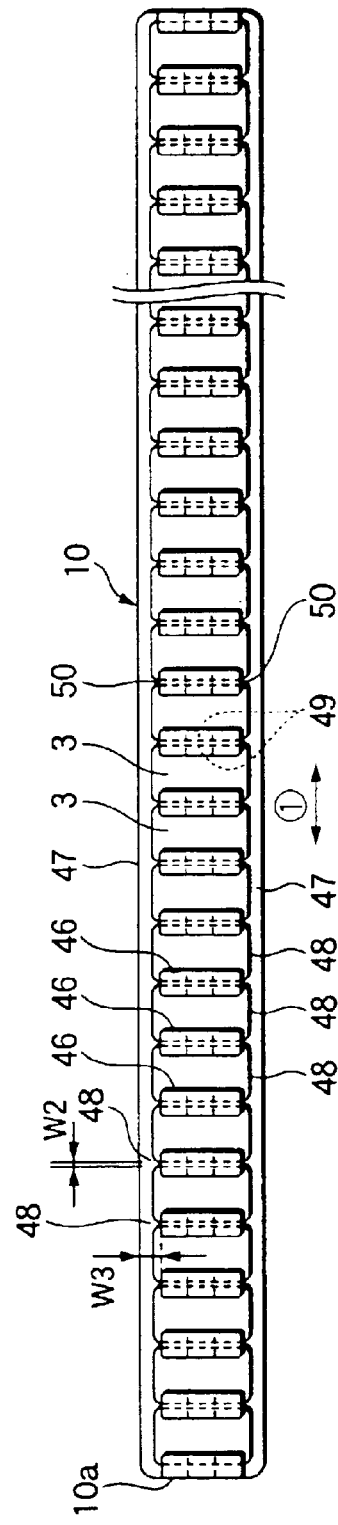
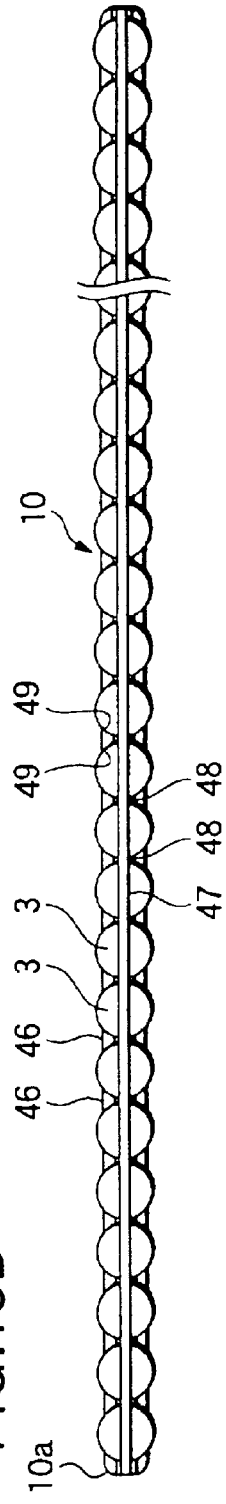
FIG.13A
FIG.13B
FIG.13C

ROLLING GUIDE APPARATUS AND ROLLER CONNECTING BODY

BACKGROUND OF THE INVENTION

1. Field of the Invention

The present invention relates to a rolling guide apparatus having rollers which under go rolling movement and are interposed between a raceway shaft and a movable member, as well as to a roller connecting member for retaining the rollers in a rotatable and slidable manner.

2. Description of the Related Art

A rolling guide apparatus comprises a track rail; a moving block which is movably provided along the track rail via a plurality of rolling elements; and a plurality of rollers to be interposed between the track rail and the moving block. FIG. 1 shows a rolling guide apparatus having rollers incorporated therein. When a moving block 101 has moved with respect to a track rail 104, rollers 100 located in a load area defined between two roller raceway surfaces 102 undergo rolling movement, thereby pushing rollers 100 located in a non-load area B. Then, the rollers 100 located in the non-load area B are pushed into a load area A on the remaining side. Thus, the rollers 100 circulate through a roller circulation path defined along the moving block 101.

A ball is the form of a sphere, and contains an indefinite number of rotation axes. Therefore, the ball can move in any direction as circumstances demand. Since the rollers 100 are cylindrical, each roller 100 has only one axis of rotation, and hence the moving direction of the roller 100 is limited to solely one direction. The rotation axis of the roller and the moving direction of the same must maintain a right angle. In relation to a linear motion guide apparatus using the rollers 100, if the roller raceway surface 102 of the moving block 101 has come out of parallel with the roller raceway surface 102 of the track rail 104 or if an offset load has acted on the moving block 101, there may arise a change of a rotation axis 105 of the roller 100 and the moving direction of the same failing to form a right angle, as shown in FIG. 2. Such a phenomenon in which the rollers 100 are inclined with respect to the normal axis of rotation is called "skew." In the case of a linear motion guide apparatus of all-roller type in which a plurality of only rollers 100 are incorporated into the roller circulation path, the end faces of the respective rollers 100 located in the direction of the rotation axis come into contact with a flange 103 formed on the moving block 101, thereby preventing occurrence of skewing of the rollers 100.

If load acts on the linear motion, rolling elements, the moving block 101, or the track rail 104 will be resiliently deformed. The extent to which the rolling elements, the moving block 10, or the track rail 104 resists deformation is called the rigidity of the linear motion guide apparatus. A linear motion guide apparatus in which balls are incorporated as the rollers 100 generally has greater rigidity than does the linear motion guide apparatus in which balls are incorporated as rolling elements. The rigidity of the linear motion guide apparatus having rollers incorporated therein is determined by the number of rollers 100 and the axial length of the same. The greater the number of rollers 100 and the longer their axial length, the greater the rigidity of the linear motion guide apparatus. In other words, incorporation of a large number of elongated rollers into the linear motion guide apparatus is effective for increasing the rigidity of the same.

When elongated rollers are used for enhancing rigidity, there cannot be ensured a large contact area between the end face of the roller 100 and the flange 103 with respect to the length of the roller 100 in a rotating direction there of. Hence, skew is apt to arise in the rollers 100. Consequently, there may arise problems; that is, a phenomenon of rollers failing to rotate (i.e., a locking phenomenon), a heating phenomenon, or a phenomenon of a table oscillating for reasons of vibration which arises when the rollers are located in a load area (i.e., a waving phenomenon).

SUMMARY OF THE INVENTION

The present invention aims at providing a rolling guide apparatus and a roller connecting member, which can reliably prevent occurrence of skew in rollers and enhance rigidity.

To achieve the above object, according to a first aspect of the invention, there is provided a rolling guide apparatus comprising:

a raceway shaft having roller raceway surfaces, a moving member having roller circulation paths which include load roller raceway surfaces corresponding to the respective roller raceway surfaces and are attached to the raceway shaft in a relatively movable manner; and a plurality of rollers which are arranged and housed in the roller circulation paths and circulate in association with movement of the moving member relative to the raceway shaft, wherein the rollers are formed so as to satisfy a relationship of approx. $1.5 < L/Da < $ approx. 3, provided that the diameter of the roller is defined as Da and the length of the roller along a direction of a rotation axis thereof is taken as L.

According to a second aspect of the invention, in the rolling guide apparatus according to the first aspect, the plurality of rollers are arranged such that the rotation axes of the rollers are brought in parallel with each other; the rolling guide apparatus has a roller retainer for rotatably and slidably retaining the plurality of rollers; and the roller retainer has a plurality of spacers, each being interposed between the rollers, and flexible joint sections for interconnecting the spacers.

According to a third aspect of the invention, in the rolling guide apparatus according to the second aspect, a recessed surface matching the geometry of exterior surface of each of the rollers is formed on either side of the spacer.

According to a fourth aspect of the invention, the rolling guide apparatus according to the second aspect, the joint sections jut out laterally from the end faces of the rollers with reference to the direction of the rotation axes.

According to a fifth aspect of the invention, in the rolling guide apparatus according to the second aspect, the guide sections are formed along the roller circulation paths of the moving member.

According to a sixth aspect of the invention, there is provided a roller connecting member comprising:

a roller retainer including:

a plurality of rollers to be arranged such that rotation axes of the rollers are brought in parallel with each other; and a roller retainer having a plurality of spacers, each being interposed between the rollers, and flexible joint sections for interconnecting the spacers, wherein the rollers are formed so as to satisfy a relationship of approx. $1.5 < L/Da < $ approx. 3, provided that the diameter of the roller is defined as Da and the length of the roller in a direction of the rotation axis thereof is taken as L.

According to a seventh aspect of the invention, in the roller connecting member according to the sixth aspect, a recessed surface matching the geometry of exterior surface of each of the rollers is formed on either side of the spacer.

According to an eighth aspect of the invention, in the roller connecting member according to the sixth aspect, the joint sections jut out laterally from the end faces of the rollers with reference to the direction of the rotation axes.

BRIEF DESCRIPTION OF THE DRAWINGS

FIG. 6B is a plan view of the roller);

FIG. 8 is an exploded perspective view showing a linear motion guide apparatus according to a first embodiment of the invention;

FIG. 9 is a side view of the linear motion guide apparatus partially including a cross-sectional view of the same perpendicular to the longitudinal direction;

FIGS. 10A and 10B show a roller which circulates through a roller circulation path, in which FIG. 10A shows a roller circulation path located in a load area, and FIG. 10B shows a roller circulation path located in a non-load area;

FIGS. 11A and 11B show a ratio of roller diameter to roller length, in which FIG. 11A shows a state in which L/Da assumes a value of 1.5, and FIG. 11B shows a state in which L/Da assumes a value of 3;

FIGS. 12A and 12B show a skew angle of roller, in which FIG. 12A shows a roller according to the embodiment, and FIG. 12B shows a needle-shaped roller; and FIGS. 13A through 13C are views showing a roller retainer, in which FIG. 13A is a plan view, FIG. 13B is a side view, and FIG. 13C is a front view.

DETAILED DESCRIPTION OF THE PREFERRED EMBODIMENTS

Figure 1:
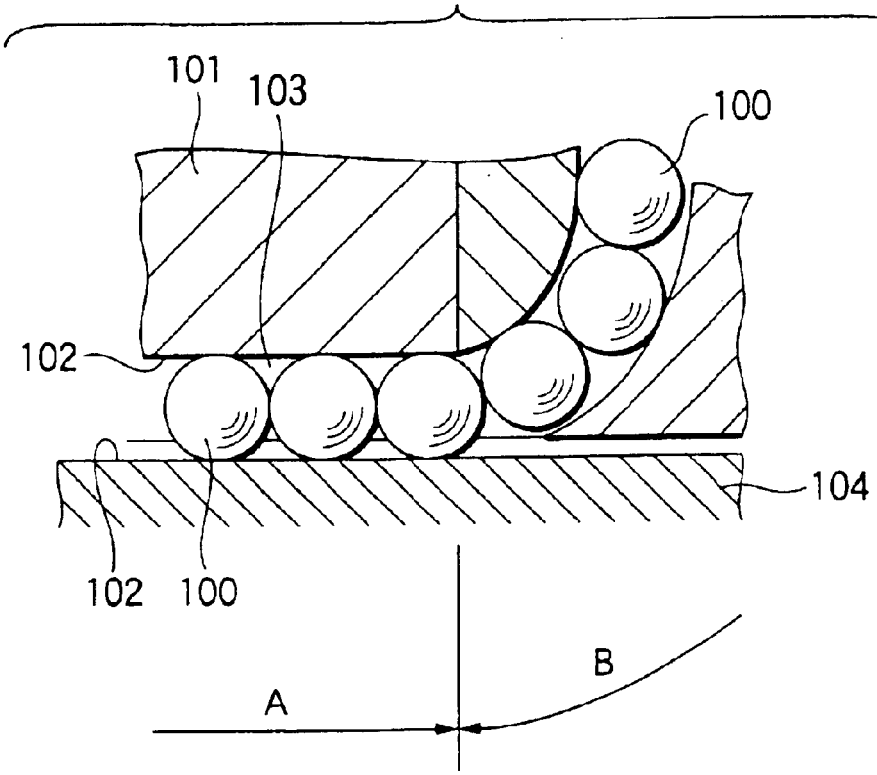
FIG. 1 is a cross-sectional view showing a linear motion guide apparatus having related-art rollers incorporated therein.
Figure 2:
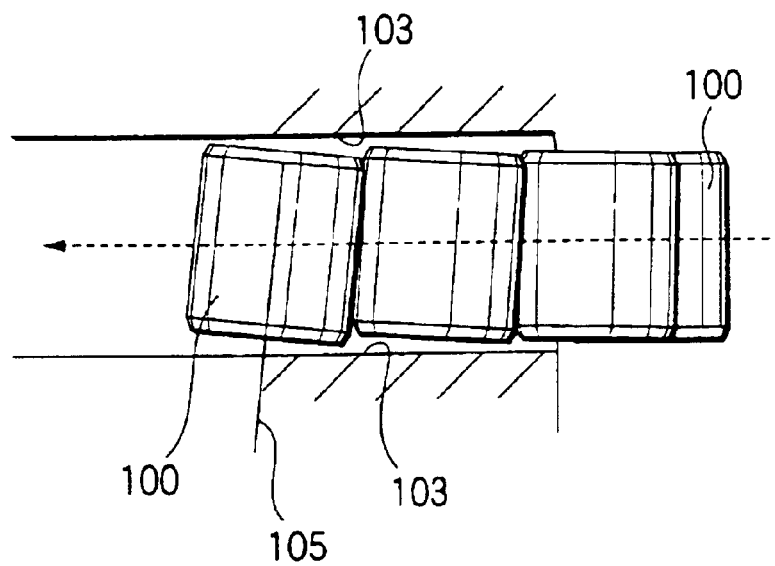
FIG. 2 is a schematic representation showing the rollers subjected to skew.

Now, a description will be given in more detail of preferred embodiments of the invention with reference to the accompanying drawings.

In order to provide a better understanding of the present invention, reference numerals provided in the accompanying drawings are associated with elements and are enclosed in parentheses in the specification. However, the reference numerals do not limit the invention to the illustrated embodiments.

The present inventor has found occurrence of skew in rollers can be reliably prevented and rigidity of a rolling movement guide apparatus can be enhanced, by means of setting, within a predetermined range, a ratio of the length of a roller in a rotating direction thereof to the diameter of the roller.

More specifically, a rolling guide apparatus according to a first aspect of the invention comprises:

a raceway shaft 1 having roller raceway surfaces 1b, and a moving member 2 having roller circulation paths which include load roller raceway surfaces 4d corresponding to the respective roller raceway surfaces 1b and which is attached to the raceway shaft 1 in a relatively movable manner; and a plurality of rollers 3 which are arranged and housed in the roller circulation paths and circulate in association with movement of the moving member 2 relative to the raceway shaft 1. Here, the rollers 3 are formed so as to satisfy a relationship of approx. 1.5<L/Da<approx. 3, provided that the diameter of the roller 3 is defined as Da and the length of roller 3 in a direction of the rotation axis thereof is taken as L.

There will be described the grounds for defining a ratio of roller length to roller diameter to a value of approx. 1.5<L/Da. A basic static load rating of a rolling guide apparatus using rollers as rolling elements (i.e., a rolling guide apparatus of roller type) and that of a rolling guide apparatus using balls as rolling elements are determined while L/Da is changed to various values, given that both rolling guide apparatus are of same model. Here, the basic static load rating refers to load at which the total amount of deformation arising in the rolling elements, that arising in the moving member, and that arising in the raceway shaft achieves a tolerance limit. A computation equation for the rolling guide apparatus of roller type and a computation equation for the rolling guide apparatus of ball type are employed, and requirements for the equations are as follows.

Figure 3:
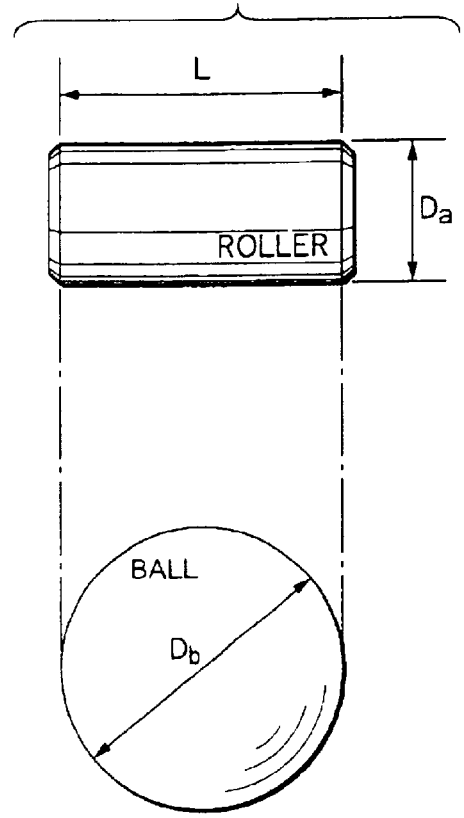
FIG. 3 is a view showing a state in which an effective length L of the roller is set so as to become substantially equal to a diameter Db of a ball under Requirement 1.

(Requirement 1) In relation to the rolling guide apparatus of roller type and the rolling guide apparatus of ball type, the effective length L of the roller is set so as to become substantially equal to the diameter Db of the ball, as shown in FIG. 3. The general reason for this is as follows. The dimension of the moving block serving as a moving member is set to a predetermined value for each model regardless of the type of rolling element (i.e., a roller and a ball). In the case of a ball, the diameter Db of the ball is set, within a range of dimension of the moving block, to a maximum dimension at which movement of the ball, such as changing of direction, becomes possible. Further, in the case of a roller, the length L and diameter Da of the roller are set to maximum dimensions at which movement of the roller, such as changing of direction, becomes possible. If an attempt is made to insert the ball and roller of maximum dimension into the moving block of identical model, a relationship of L≈Db will inevitably be achieved.

Figure 4:
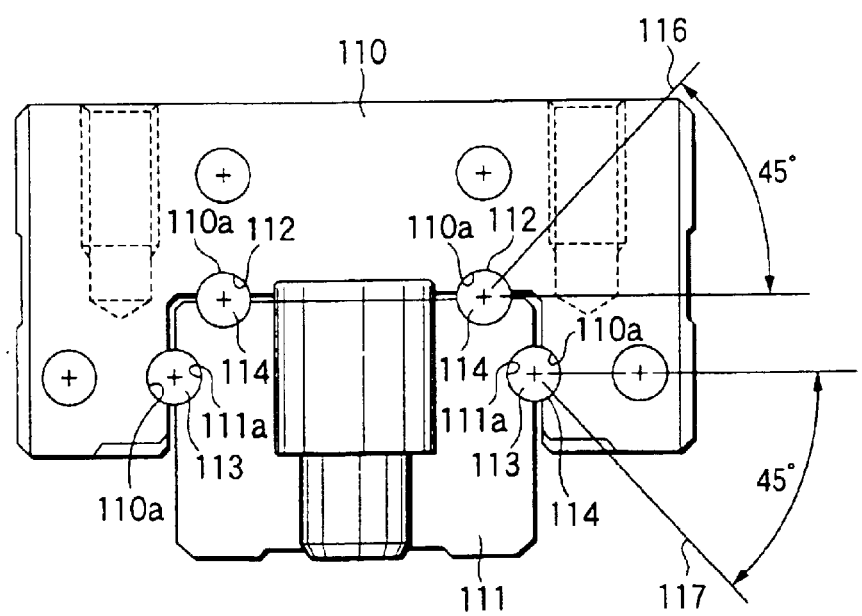
FIG. 4 is a cross-sectional view showing a rolling guide apparatus of ball type which is an object of comparison under Requirement 2.

(Requirement 2) There has been used a rolling guide apparatus of roller type described in connection with an embodiment shown in FIGS. 8 and 9. As a rolling guide apparatus of ball type to be compared, there has been used a rolling guide apparatus of structure such as that shown in FIG. 4. The rolling guide apparatus is of ball type and has been developed by the present applicant (assigned Model NRS by the applicant) so as to exhibit the same rigidity as that of a rolling guide apparatus of roller type. Of all pieces of commercially-available rolling guide apparatus, including products of other manufacturing companies, the rolling guide apparatus has the maximum basic static load rating.

The schematic construction of the rolling guide apparatus of ball type will now be described. Two rows of balls 112 are defined between a lower surface of the moving block 110 and an upper surface of a track rail 111. Further, a total of two rows of balls 113 are provided on respective sides of the track rail 111 and are defined between an interior side surface of the moving block 110 and an exterior side surface of the track rail 111. The rolling guide apparatus is characterized in that a ball raceway groove 110a of the moving block 110 and a ball raceway groove 111a of the track rail 111 are formed to sufficient depth to receive heavy load. A line of contact 116 is defined by connecting the center point of the ball 114 and a contact point existing between the ball 114 and the ball raceway groove 110a of the moving block 110. Similarly, a line of contact 117 is defined by connecting the center point of the ball 114 and a contact point existing between the ball 114 and the ball raceway groove 111a of the track rail 111. The lines of contact 116 and 117 are each set so as to form an angle of 45° with respect to a horizontal line. Hence, the balls 114 can uniformly receive radial load, inverse radial load, and horizontal load.

Figure 5:
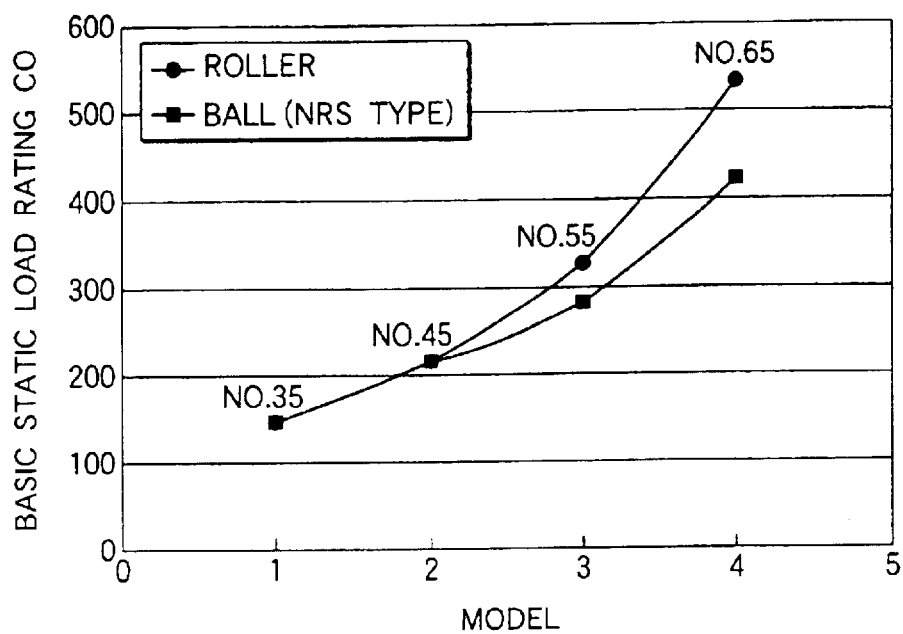
FIG. 5 is a graph showing a basic static load rating Co of a rolling guide apparatus of roller type and a basic static load rating Co of a rolling guide apparatus of ball type when L/Da is set to a value of 1.5.

The basic static load rating of the rolling guide apparatus of roller type is determined through use of a computation equation for roller type while L/Da is changed to various values. Further, the basic static load rating of the rolling guide apparatus of ball type is determined through use of a computation equation for ball type while L/Da is changed to various values. Consequently, the basic static load rating of the rolling guide apparatus of roller type is found to exceed that of the rolling guide apparatus of ball type at a boundary where L/Da≈1.5. FIG. 5 is a graph showing a comparison between the basic static load rating Co of the rolling guide apparatus of roller type and the basic static load rating Co of the rolling guide apparatus of ball type when L/Da has attained a value of 1.5. As can be seen from FIG. 5, given that L/Da assumes a value of 1.5, the basic static load rating Co of the rolling guide apparatus of roller type is found to exceed that of the rolling guide apparatus of ball type with regard to all models. In contrast, when L/Da assumes a value of 1.5 or less, the basic static load rating Co of the rolling guide apparatus of roller type is found to become lower than that of the rolling guide apparatus of ball type, rendering use of rollers meaningless.

Hence, by means of setting the ratio of roller length to roller diameter to a value of approx. 1.5<L/Da, the basic static load rating Co of the rolling guide apparatus of roller type becomes greater that of the rolling guide apparatus of ball type when the pieces of the apparatus are of same model. Hence, appropriateness of use of rollers; that is, an increase in rigidity of rollers, is achieved.

Next, there will be described the grounds for setting the ratio of roller length to roller diameter to a value of L/Da<approx. 3. In consideration that rollers have been chamfered, a skew angle β at which rollers are inclined with respect to the normal axis of rotation is defined by Eq. (1) provided below.

$$\beta = \sin^{-1}\left[\frac{2bL(1+\xi) - \sqrt{(2bL(1+\xi))^2 - 8\xi L^2(L^2+b^2)}}{2(L^2+b^2)}\right] \quad \text{Eq. (1)}$$

Figure 6A:
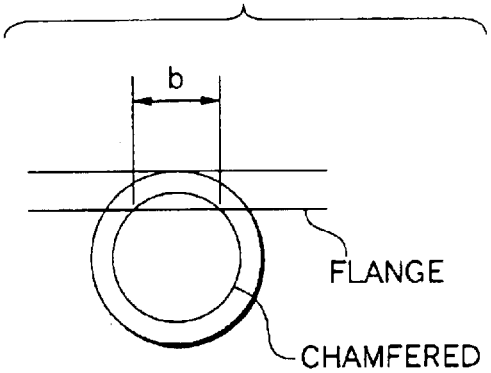
FIGS. 6A and 6B are illustrations showing values employed in an expression for computing a skew angle (wherein FIG. 6A is a side view of a roller.
Figure 6B:
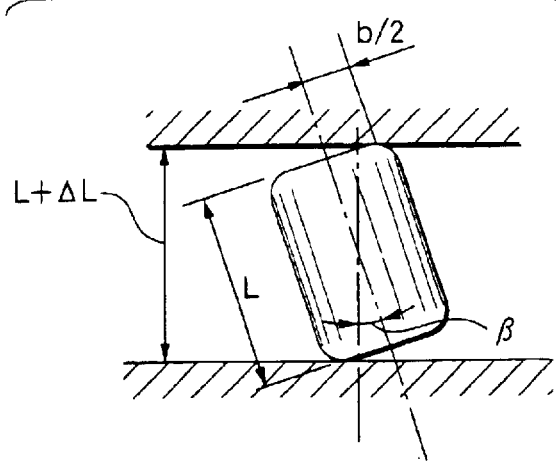

As shown in FIGS. 6A and 6B, L denotes the length of a roller; L+ΔL denotes the width of a groove; "b" denotes the width of a contact area existing between the roller and a flange when the roller is brought into intimate contact with the flange; and ξ=ΔL/L≈0.01 through 0.1. Through use of the above-described equation for computing an angle, there is plotted a graph whose horizontal axis represents ΔL/L(=ξ) and whose vertical axis represents a skew angle β while L/Da is changed to various values, as shown in FIG. 7 (where Da=2b) The value of L/Da has been changed among 1.5, 3, and 4.

Figure 7:
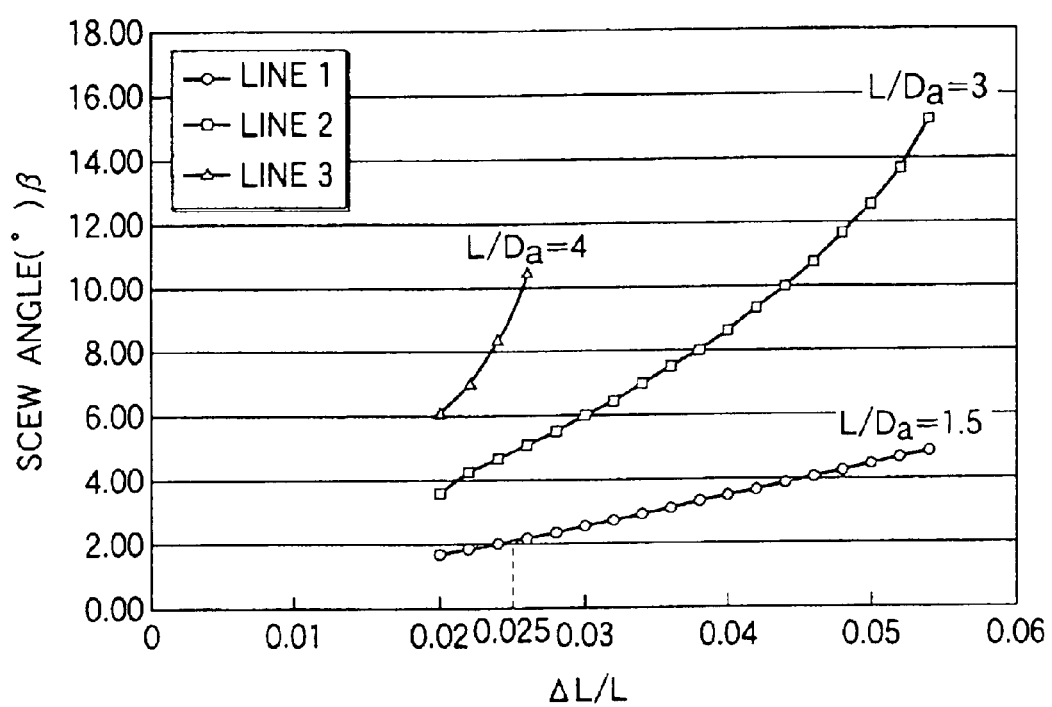
FIG. 7 is a graph whose horizontal axis is represented by $\Delta L/L(=\zeta)$ and whose vertical axis is represented by a skew angle $\beta$.

As is evident from FIG. 7, the rate of change in ΔL/L-β sharply becomes high at a boundary where L/Da≈3. For example, when L/Da assumes a value of 4, a skew angle changes greatly from an angle of about 6° to an angle of about 10° when ΔL/L has increased from a nominal value of about 0.02 to a value of about 0.025; that is, by a value of 0.005. Hence, in order to suppress skew angle, axial clearance ΔL must be controlled very strictly, thereby raising a problem of a cost increase. In contrast, if L/Da is set to a value of approx. 3 or less, a rate of change in ΔL/L-β will be comparatively gentle. Even if a slight error arises in a setting of ΔL, not-so-large influence is imposed on the skew angle. In other words, the rigorousness of dimensional control of the axial clearance ΔL can be relaxed, by means of setting L/Da to a value of approx. 3 or less.

Occurrence of skew can be prevented reliably without involvement of very rigorous dimensional management of axial clearance ΔL, by means of setting L/Da to less than approx. 3. Further, there is no necessity for very rigorous dimensional management of axial clearance ΔL. Hence, an attempt can be made to curtail the cost of a rolling guide apparatus.

According to a second aspect of the invention, the plurality of rollers 3 are arranged such the rotation axes of the rollers are brought in parallel with each other. The rolling guide apparatus has a roller retainer 10 for rotatably and slidably retaining the plurality of rollers 3. Further, the roller retainer 10 has a plurality of spacers 46, each being interposed between the rollers 3, and flexible joint sections 47 for interconnecting the spacers 46.

According to the invention, since the roller retainer 10 aligns the rollers in a predetermined position, occurrence of skew in the rollers 3 can be prevented. Even if skew has arisen, the roller retainer 10 corrects the skew in the rollers 3 such that each of the rollers 3 again maintains a predetermined rotation axis by means of elastic restoration force of the joint sections 47. Thus, the roller retainer 10 has the effect of aligning the rollers 3 to a predetermined position and the effect of preventing accumulation of skew in the rollers 3. In cooperation with the effect yielded by setting the ratio of roller diameter to roller length to L/Da<approx. 3, use of the roller retainer 10 reliably prevents occurrence of skew in the rollers 3.

According to a third aspect of the invention, a recessed surface 49 matching the geometry of exterior surface of each of the rollers 3 is formed on either side of the spacer 46.

According to the invention, as a result of the recessed surfaces 49 retaining the rollers 3, there can be prevented removal of the rollers 3 from the roller retainer 10; that is, a moving member 2, which would otherwise be caused when the moving member 2 is removed from the raceway shaft 1. Further, a sufficient amount of lubricant is accumulated in a space defined between the recessed surface 49 and the roller 3, thus achieving appropriate lubricating action.

According to a fourth aspect of the invention, the joint sections 47 jut out laterally from the end faces of the rollers 3 with reference to the direction of the rotation axes.

According to a fifth aspect of the invention, guide sections (11a, 12a, 13a, and 20a) are formed along the roller circulation paths of the moving member 2.

In this specification, the term "guide" preferably refers to the following state.

Clearance of slight dimension is formed between the joint sections 47 of the roller retainer 10 and the guide sections 11a, 12a, 13a, and 20a. If the roller retainer 10 has snaked or changed direction slightly, the joint sections 47 come into contact with a wall surface of the guide sections 11a, 12a, 13a, and 20a. In other words, the joint sections 47 do not remain in contact with the guide sections 11a, 12a, 13a, and 20a a tall times. The rolling guide apparatus can be constructed such that the joint sections 47 always remain in contact with the guide sections 11a, 12a, 13a, and 20a. However, the clearance existing between the joint sections 47 and the guide sections 11a, 12a, 13a, and 20a suppresses the resistance of contact which will arise therebetween, thus diminishing movement resistance of the moving member 2.

According to the invention, the roller retainer 10 is guided so as to maintain a predetermined track in the roller circulation path by means of the guide sections 11a, 12a, 13a, and 20a. Accordingly, the rollers 3 retained by the roller retainer 10 also hold a predetermined track, and hence occurrence of skew in the rollers 3 can be prevented with much greater reliability.

According to a sixth aspect of the invention, the invention can be constituted as a roller connecting member. The connecting member has a roller retainer 10, the retainer comprising:

a plurality of rollers 3 to be arranged such that rotation axes of the rollers are brought in parallel with each other;

a plurality of spacers 46, each of which is interposed between the rollers 3 and has at either side thereof a recessed surface 49 matching the geometry of outer circumferential surface of an adjacent roller 3; and flexible joint sections 47 for connecting together the spacers 46, wherein the rollers 3 are formed so as to satisfy a relationship of approx. $1.5 < L/Da < $ approx. $3$, provided that the diameter of the roller 3 is defined as Da and the length of the roller 3 in a direction of rotation axis thereof is taken as L.

According to a seventh aspect of the invention, a recessed surface 49 matching the geometry of exterior surface of each of the rollers 3 is formed on either side of the spacer 46.

According to an eighth aspect of the invention, the joint sections 47 jut out laterally from the end faces of the rollers with reference to the direction of rotation axes.

Hereinafter, a description will be given in more detail of preferred embodiments of the invention with reference to the accompanying drawings.

FIGS. 8 and 9 show a linear motion guide apparatus serving a rolling guide apparatus according to a first embodiment of the invention. FIG. 8 is an exploded perspective view of the linear motion guide apparatus; and FIG. 9 provides a side elevation view of an assembled linear motion guide apparatus and a cross-sectional view of the apparatus taken along a direction perpendicular to the longitudinal direction of a track rail. The linear motion guide apparatus has a track rail 1 serving as a linearly-extending track shaft, and a moving block 2 serving as a moving member movably attached to the track rail 1 via a plurality of rollers 3 acting as rolling elements.

The track rail 1 is narrowly elongated so as to assume a rectangular cross-sectional profile. A groove 1a having a V-shaped cross-sectional profile is formed on either side surface of the track rail 1 so as to extend in the longitudinal direction. As shown in FIG. 9, the groove 1a has side surfaces 1b, 1b and a bottom surface 1c. The wall surfaces 1b, 1b of the groove 1a cross each other at an angle of 90°. Here, upper and lower wall surfaces 1b are taken as roller raceway surfaces 1b, 1b over which the rollers 3 are to roll. Two roller raceway surfaces 1b, 1b are provided vertically on either side of the track rail 1; namely, a total of four roller raceway surfaces 1b are formed on the track rail 1.

The moving block 2 has a horizontal section 2a opposing an upper surface of the track rail 1, and sleeve sections 2b which extend downward from respective sides of the horizontal section 2a and oppose the right and left side surfaces of the track rail. Two roller circulation paths vertically arranged in a row are formed in each of the right and left sleeve sections 2b; namely, a total of four roller circulation paths are formed (see FIG. 9).

First, the roller circulation paths will be described. As shown in FIG. 9, two load roller raceway surfaces 4d vertically arranged in a row are formed in each of the sleeve sections 2b of the moving block 2. A space defined between the load roller surfaces 4d and the roller raceway surfaces 1b constitutes a load area of the roller circulation paths.

Two roller relief paths 7 vertically arranged in a row are formed in the respective sleeve sections 2b so as to be spaced a given interval away from and in parallel with the load roller raceway surfaces 4d. The roller relief paths 7 constitute a non-load area of the roller circulation paths.

U-turn paths 8 which connect the load roller raceway surfaces 4d, 4d with both ends of the respective roller relief paths 7 and circulate the rollers 3 are provided in the respective sleeve sections 2b. One U-turn path 8 connects the upper load roller raceway surface 4d with the lower roller relief path 7, and the other U-turn path 8 connects the lower load roller raceway surface 4 with the upper roller relief path 7. Thus, a grade crossing exists between a pair of U-turn paths 8. The U-turn paths 8 also constitute non-load areas of the roller circulation paths.

Annular roller circulation paths are constituted by the load roller raceway surfaces 4d, a pair of the U-turn paths 8, and the roller relief paths 7. Each of the roller circulation paths is formed within a single plane, and the rollers 3 two-dimensionally circulate within each of the roller circulation paths. A plane in which one roller circulation path exists crosses at a right angle another plane in which another roller circulation path exists. Here, one roller circulation path is present inside of the other roller circulation path.

As shown in FIG. 8, the moving block 2 comprises a steel block member 4; plastic circulation path formation members 11, 12, 13, 15a, 15b, and 20 to be incorporated into the block main body 4; and a pair of side covers 5 to be attached to respective end faces of the block main body 4 having the plastic circulation path formation members 11, 12, 13, 15a, 15b, and 20 incorporated therein. Protuberances 4c matching the geometry of the grooves 1a are formed in the respective sleeve sections 4b of the block main body 4. The two load roller raceway surfaces 4d serving as load rolling member raceway sections corresponding to the roller raceway surfaces 1b are formed on each of the protuberances 4c (see FIG. 9). Two load roller raceway surfaces 4d are formed in the respective sleeve sections 4b of the block main body 4; namely, a total of four load roller raceway surfaces. In the present embodiment, the two roller raceway surfaces 1b and the two load roller raceway surfaces 4d are formed on either side of the block main body 4. The number of roller raceway surfaces 1b and the number of load roller raceway surfaces 4d can be set to various values depending on the type of the linear motion guide apparatus.

The plastic circulation formation members comprise retaining members 11, 12 and 13 which extend along side edges of the respective load roller raceway surfaces 4d and prevent removal of the rollers 3 from the load roller raceway surfaces 4d when the moving block 2 is removed from the track rail 1; relief path constitution members 14 for returning the rollers 3; and inner-radius guide section formation members 15a and 15b for forming inner-radius guide sections of the U-turn paths 8. The retaining members 11, 12, 13; the relief path constitution members 14; a pair of the inner-radius guide section formation members 15a; and a pair of the inner-radius guide section formation members 15b are formed from resin separately from the block main body 4. They are incorporated into the block main body 4.

As shown in FIG. 9, the retaining members are classified into first retaining members 11 for retaining lower portions of the lower rollers 3; second retaining members 12 for retaining upper portions of the lower rollers 3 and lower portions of the upper roller 3; and third retaining members 13 for retaining upper portions of the upper rollers 3. These retaining members act as flanges for guiding the rollers 3 in an axial direction.

As shown in FIG. 8, the first retaining members 11 are formed from long, thin plastic molded products. By means of incorporating the first retaining members 11 into the block main body 4, there are formed guide grooves 11a (see FIG. 9) serving as guide sections for guiding a connecting belt of the roller retainer 10 to be described later. As a result of the first retaining members 11 being sandwiched between the pair of side covers 5, the first retaining members 11 are attached to the moving block 2 while both ends are supported.

The second retaining members 12 are formed from long, thin plastic molded products. Guide grooves 12a (see FIG. 9) are formed on either side of each of the second retaining members 12 for guiding the connecting belt of the roller retainer 10. As a result of the second retaining members 12 being sandwiched between the pair of side covers 5, the second retaining members 12 are attached to the moving block 2 while both ends are supported.

The third retaining members 13 are formed from long, thin plastic molded products. By means of incorporating the third retaining members 13 into the block main body 4, there are formed guide grooves 13a (see FIG. 9) serving as guide sections for guiding a connecting belt of the roller retainer 10 to be described later. As a result of the third retaining members 13 being sandwiched between the pair of side covers 5, the third retaining members 13 are attached to the moving block 2 while both ends are supported, as in the case of the first retaining members 11.

Each of the relief path formation members 14 is formed from half pipe members 14a, 14b which are formed by dividing a pipe into two parts in the direction of the rotation axis. Each of the half pipe members 14a, 14b has a groove 20 matching the geometry of the rollers 3 extending in the longitudinal direction; a guide groove 20a (see FIG. 9) serving as a guide section for guiding the joint belt of the roller retainer 10; and a flange 19 extending longitudinally along either side of the groove 20. The roller relief paths 7 are formed by the relief path formation members 14.

The inner-radius guide section formation members 15a are split in two in the longitudinal direction of the track rail 1. By means of combining together the two inner-radius guide section formation members 15a, there is formed a U-turn path of grade crossing. Further, a guide groove which is to serve as a guide section for guiding the connecting belt of the roller retainer 10 is formed in the U-turn path. An inner-radius guide section 21 for an inner-radius-side roller circulation path is formed in a split member 15a facing the moving block 2 (i.e., the inside). The inner-radius guide section 21 is formed into the form of a substantially-semicircular arc. An outer-radius guide section 31 for the inner-radius-side roller circulation path and an inner-radius guide section 32 for the outer-radius-side roller circulation path are formed in a split member 15b facing the side cover 5 (i.e., the outside). The inner-radius-side guide section 32 and the outer-radius-side guide section 31 are formed into the shape of a substantially-semicircular arc.

Each of the side covers 5 is matched in cross-sectional profile with the block main body 4. The side cover 5 has a horizontal section 5a and a pair of sleeve sections 5b. Outer-radius guide sections 36 for the outer-radius-side roller circulation path are formed in the sleeves 5b. Further, the inner-radius guide formation members 15a, 15b that are combined together are fitted to the respective sleeves 5b.

As shown in FIG. 8, the side covers 5 are attached to the respective longitudinal ends of the block main body 4. Bolts are inserted into bolt insertion holes formed in the side covers 5, and the bolts are screw-engaged into screw holes formed in the end faces of the block main body 4, whereby the side covers 5 are fastened to the block main body 4. As a result, the inner-radius guide sections 15a, 15b are fixed to the block main body 4. Further, a decorative plate 38 is bonded to the outside of each of the side covers 5.

Figure 10A:
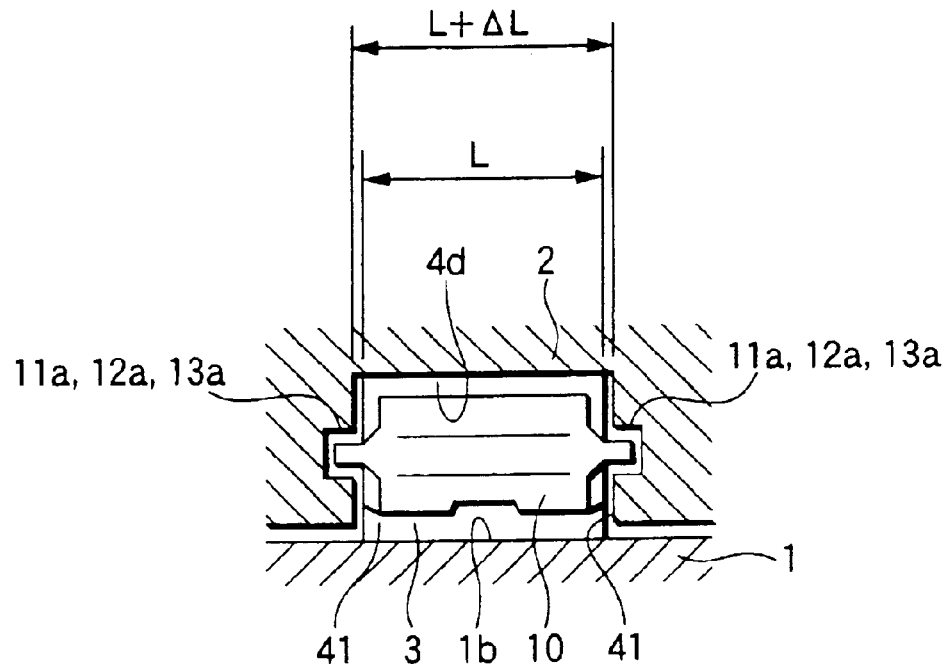
Figure 10B:
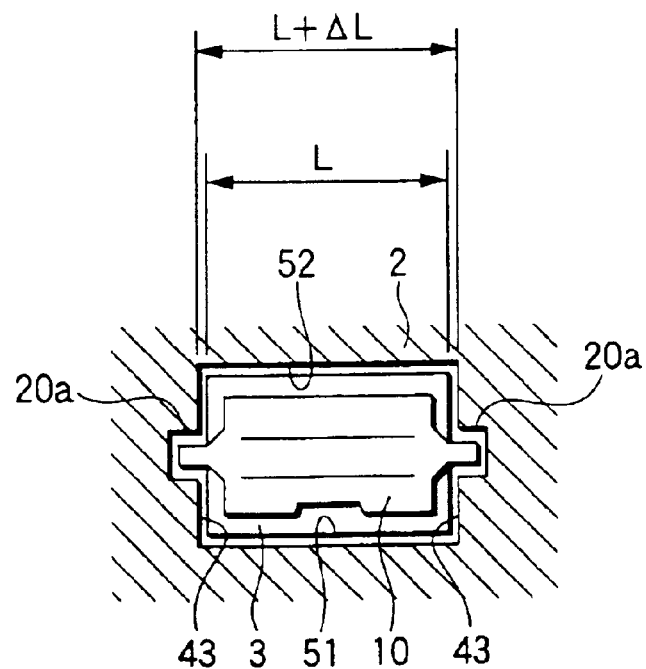

FIGS. 10A and 10B show the rollers 3 that circulate through the roller circulation path. FIG. 10A shows the rollers 3 which rotate through the load area defined between the roller raceway surface 1b of the track rail 1 and the moving block 2; and FIG. 10B shows the rollers 3 which move through the relief path which is to act as a non-load area.

As shown in FIG. 10A, the roller circulation path in the load area is formed so as to assume a rectangular cross-sectional profile matching the cross-sectional profile of the roller 3. Guide flanges 41 are formed in the moving block 2 by means of the retaining members 11, 12 and 13 for guiding the end faces of the rollers 3 located in the direction of a rotation axis thereof. A distance L+ΔL between the flanges 41 is set so as to become slightly longer than the length L of the roller 3 located in the direction of a rotation axis thereof such that there arises axial clearance ΔL. Here, $\zeta = \Delta L/L$ is set so as to fall within a range of, e.g., 0.02 to 0.07. Guide grooves 11a, 12a, and 13a are formed in the respective flanges 41 for guiding a pair of connecting belts of the roller retainer 10 to be described later.

As shown in FIG. 10B, the roller circulation path in the non-load area is also formed so as to assume a rectangular cross-sectional profile matching the cross-sectional profile of the roller 3. Guide flanges 43 are formed in the moving block 2 from the relief path formation members 14 for guiding the end faces of the rollers 3 located in the direction of a rotation axis thereof. A distance L+ΔL between the flanges 43 is set so as to become slightly longer than the length L of the roller 3 located in the direction of a rotation axis thereof such that there arises axial clearance ΔL. Guide grooves 20a for guiding a pair of connecting belts of the roller retainer 10 to be described later are formed in the respective flanges 43. A dimension between the inner-radius guide surface 51 and the outer-radius guide surface 52 of the roller circulation path in the non-load area is set so as to become slightly larger than the diameter of the roller 3 such that slight clearance a rises between the outer periphery of the roller 3 and the inner-radius and outer-radius guide surfaces 51, 52.

Figure 11A:
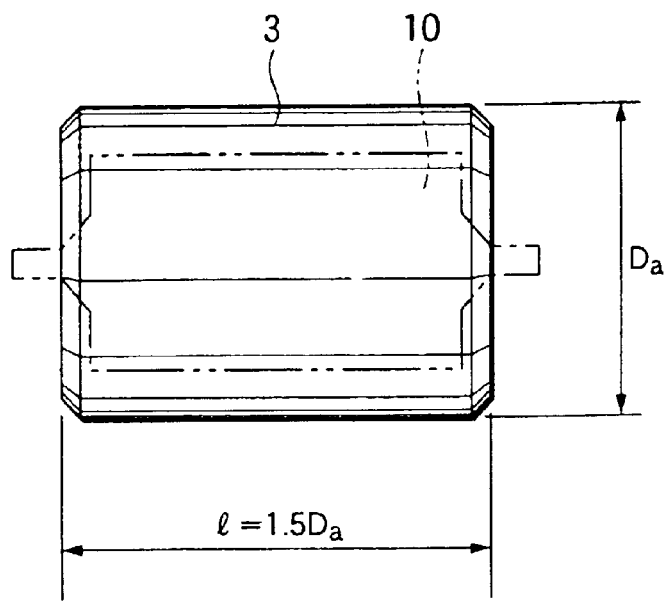
Figure 11B:
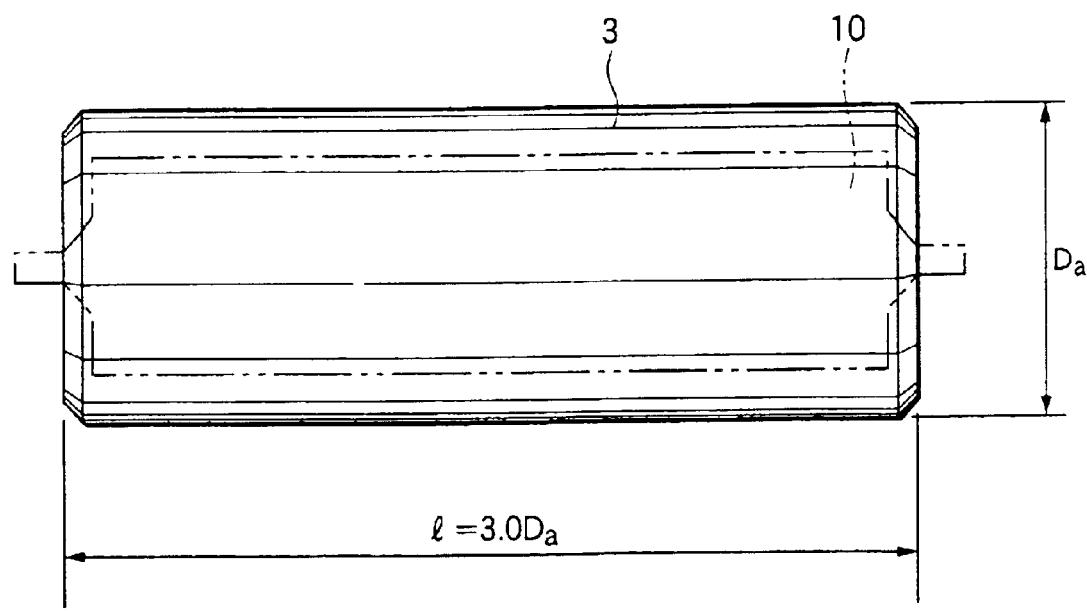

FIGS. 11A and 11B show a ratio of the diameter Da of the roller 3 to the length L of the same. FIG. 11A shows the roller 3 assuming L/Da of 1.5, and FIG. 11B shows the roller 3 assuming L/Da of 3. The ratio of the diameter Da of the roller 3 to the length L of the roller 3 is arbitrarily set so as to fall within the range.

Figure 12A:
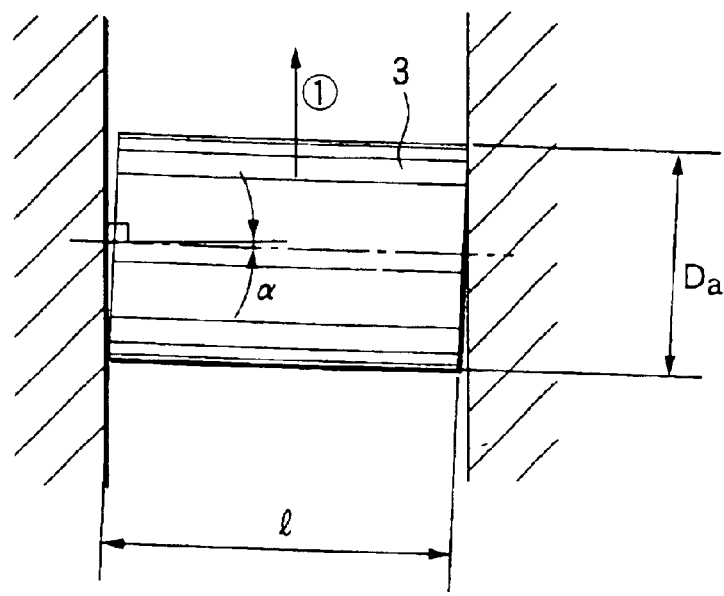
Figure 12B:
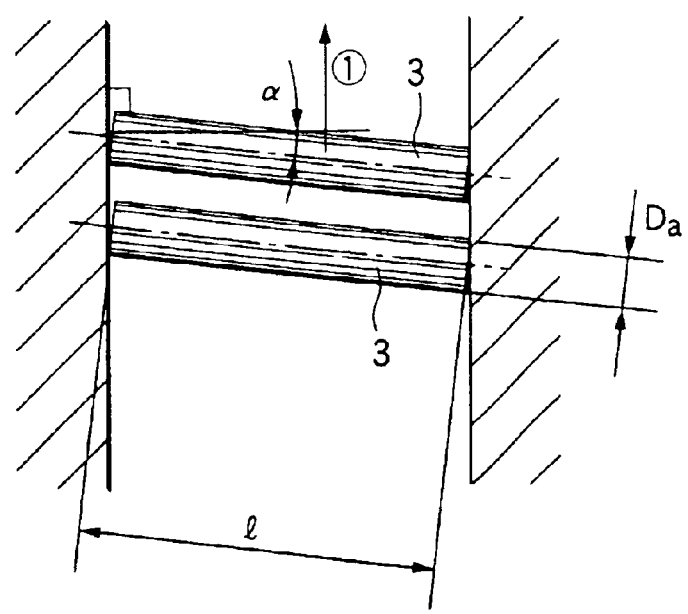

In the present embodiment, by means of setting the ratio to approx. 1.5<L/Da, the rolling guide apparatus of roller type becomes greater in basic static load rating Co that the rolling guide apparatus of ball type in the manner as mentioned previously. The appropriateness of use of the roller 3: that is, an effect of increased rigidity, is achieved. As shown in FIG. 12A, the diameter Da of the roller 3 becomes greater than the length L of the same in the direction of a rotation axis by means of setting the ratio of roller length to roller diameter to L/Da<approx. 3. As mentioned above, occurrence of skew can be prevented without fail without involvement of rigorous dimensional control of the axial clearance ΔL. As shown in FIG. 12B, if the ratio to L/Da>3 is set, the rollers 3 assume the shape of a needle. Hence, a skew angle α will inevitably increase unless the dimension of axial clearance ΔL is not controlled rigorously.

FIGS. 13A through 13C show a roller connecting member having the rollers 3 incorporated therein. FIG. 13A is a plan view of the roller connecting member. FIG. 13B is a side view of the roller connecting member, and FIG. 13C is a front view of the same. The rollers 3 are linked together in the form of a chain by means of the roller retainer 10, one roller connecting member is housed in each of the four roller circulation paths. The roller retainer 10 is formed integrally from the spacers 46 and the joint belts 47 with use of joint necks 48. Thus, the entire roller retainer 10 constitutes a strip having ends. In order to facilitate attachment of the roller retainer 10 to the moving block 2, front ends 10a of the roller retainer 10 are rounded.

The spacers 46 are formed into the shape of a substantially-rectangular-parallelepiped. Recessed surfaces 49 matching the geometry of the outer periphery of adjacent roller 3 are formed in each of the spacers 46. The recessed surfaces 49 come into slidable contact with the outer peripheral surfaces of the rollers 3. The width of the spacer 46 is made slightly shorter than the length of the roller 3 in the direction of a rotation axis thereof.

The pair of connecting belts 47 are connected to side surfaces 50 of the respective spacers 46 in the direction of the rotation axis of the rollers 3. The connecting belts 47 jut out laterally from the end faces of the rollers 3 with reference to the direction of the rotation axes. The connecting belts 47 are situated within a plane including the rotation axes of the rollers 3. Moreover, the connecting belts 47 are formed thinly so as to become flexible in agreement with the roller circulation path.

As shown in FIG. 13, the width W2 of the joint neck 48 in the longitudinal direction of the connecting belts 47 conincides with the smallest interval between the recessed surfaces 49. Width W3 of the joint neck 48 in the direction of a rotation axis of the roller 3 is set to such a value that the spacers 46 can incline with respect to the connecting belts 47. As shown in FIG. 13C, a reinforcement rib 53 is formed in each of the joint necks 48. The reinforcement ribs 53 prevent the connecting belts 47 from moving in direction (2) orthogonal to the plane including the rotation axes of the rollers 3 with reference to the spacers 46. Conversely, the reinforcement ribs 53 prevent the spacers 46 and, by extension, the rollers 3 from moving in direction (2) orthogonal to the plane including the rotation axes of the rollers 3 and direction (1) with respect to the connecting belts 47. The connecting belts 47 are guided by the guide groove so as to move along a predetermined track. Hence, the rollers 3 can be moved along a predetermined track without fail, by means of preventing the rollers 3 from moving in direction (2) with respect to the connecting belts 47.

Since the roller retainer 10 aligns the rollers 3 to a predetermined position, occurrence of skew in the rollers 3 can be prevented. Even if skew has arisen, skew in the rollers 3 can be corrected such that the rollers 3 again retain predetermined rotation axes, by means of the resilient restoration force of the pair of connecting belts 47. Thus, the roller retainer 10 has the effect of aligning the rollers 3 to a predetermined position and the effect of preventing accumulation of skew in the rollers 3. Further, a skew angle can be reduced by means of setting the ratio of roller diameter to roller length to L/Da<approx. 3. Consequently, in cooperation with the effects of the roller retainer 10 which align the rollers 3 to a predetermined position and prevent accumulation of skew, skew in the rollers 3 can be prevented without fail. Since the roller retainer 10 is guided by the guide grooves 11a, 12a, 13a, and 20a so as to maintain a predetermined track in the roller circulation path. Hence, the rollers 3 retained by the roller retainer 10 also maintain a predetermined track, and the rollers 3 can be aligned more appropriately.

Although the previous embodiment has employed the rolling guide apparatus as a linear motion guide apparatus for guiding linear motion, the invention is not limited to linear motion. There may also be employed a curvilinear motion guide apparatus for guiding curvilinear motion. Alternatively, there may also be employed a so-called roller-type rolling guide apparatus which is not provided with a retainer.

As has been described, by means of setting a ratio of roller length to roller diameter to a value of approx. 1.5<L/Da, the basic static load rating Co of the rolling guide apparatus of roller type becomes greater than that of the rolling guide apparatus of ball type when the pieces of the apparatus are of same model. Hence, appropriateness of use of rollers: that is, an increase in rigidity of rollers, is achieved. By means of setting the ratio to a value of L/Da<approx. 3, occurrence of skew can be prevented without fail without involvement of rigorous dimensional control of the axial clearance ΔL. Hence, occurrence of skew in rollers and an increase in rigidity can be achieved without fail.

The roller retainer aligns the rollers to a predetermined position and prevents occurrence of skew in the rollers. Even if skew has arisen, skew in the rollers can be corrected such that the rollers again retain predetermined rotation axes, by means of the resilient restoration force of the connecting sections. Thus, the roller retainer has the effect of aligning the rollers to a predetermined position and the effect of preventing accumulation of skew in the rollers. Further, a skew angle can be reduced by means of setting the ratio of roller diameter to roller length to L/Da<approx. 3. Consequently, in cooperation with the effects of the roller retainer set forth, skew in the rollers can be prevented without fail.

What is claimed is:

1. A rolling guide apparatus comprising:
   a raceway shaft having roller raceway surfaces,
   a moving member having roller circulation paths which include load roller raceway surfaces corresponding to the respective roller raceway surfaces and are attached to the raceway shaft in a relatively movable manner; and a plurality of cylindrical rollers which are arranged and housed in the roller circulation paths and circulate in association with movement of the moving member relative to the raceway shaft, wherein the rollers are formed so as to satisfy a relationship of $1.5<L/Da<3$, provided that the diameter of the roller is defined as Da and the length of the roller along a direction of a rotation axis thereof is taken as L.

2. The rolling guide apparatus according to claim 1, wherein the plurality of rollers are arranged such that the rotation axes of the rollers are brought in parallel with each other; the rolling guide apparatus has a roller retainer for rotatably and slidably retaining the plurality of rollers; and the roller retainer has a plurality of spacers, each being interposed between the rollers, and flexible joint sections for interconnecting the spacers.

3. The rolling guide apparatus according to claim 2, wherein a recessed surface matching the geometry of exterior surface of each of the rollers is formed on either side of the spacer.

4. The rolling guide apparatus according to claim 2, wherein guide sections are formed along the roller circulation paths of the moving member.

5. A rolling guide apparatus composing:

a raceway shaft having roller raceway surfaces, a moving member having roller circulation paths which include load roller raceway surfaces corresponding to the respective roller raceway surfaces and are attached to the raceway shaft in a relatively movable manner; and a plurality of rollers which are arranged and housed in the roller circulation paths and circulate in association with movement of the moving member relative to the raceway shaft, wherein the rollers are formed so as to satisfy a relationship of $1.5<L/Da<3$, provided that the diameter of the roller is defined as Da and the length of the roller along a direction of a rotation axis thereof is taken as L, wherein the plurality of rollers are arranged such that the rotation axes of the rollers are brought in parallel with each other; the rolling guide apparatus has a roller retainer for rotatably and slidably retaining the plurality of rollers; and the roller retainer has a plurality of spacers, each being interposed between the rollers, and flexible joint sections for interconnecting the spacers, and wherein the joint sections jut out laterally from the end faces of the rollers with reference to the direction of the rotation axes.

6. A roller connecting member comprising:

a plurality of cylindrical rollers to be arranged such that rotation axes of the rollers are brought in parallel with each other, and a roller retainer having a plurality of spacers, each being interposed between the rollers and flexible joint sections for interconnecting the spacers, wherein the rollers are formed so as to satisfy a relationship of a $1.5<L/Da<3$, provided that the diameter of the roller is defined as Da and the length of the roller in a direction of the rotation axis thereof is taken as L.

7. The roller connecting member according to claim 6, wherein a recessed surface matching the geometry of exterior surface of each of the rollers is formed on either side of the spacer.

8. A rolling guide apparatus comprising:

a plurality of rollers to be arranged such that rotation axes of the rollers are brought in parallel with each other, and a roller retainer having a plurality of spacers, each being interposed between the rollers and flexible joint sections for interconnecting the spacers, wherein the rollers are formed so as to satisfy a relationship of $1.5<L/Da<3$, provided that the diameter of the roller is defined as Da and the length of the roller in a direction of the rotation axis thereof is taken as L, wherein the joint sections jut out laterally from the end faces of the rollers with reference to the direction of the rotation axes.

* * * * *